(12) United States Patent
Uryu et al.

(10) Patent No.: US 10,184,560 B2
(45) Date of Patent: Jan. 22, 2019

(54) RANGE SWITCHING DEVICE

(71) Applicant: Mitsubishi Electric Corporation, Tokyo (JP)

(72) Inventors: Takuya Uryu, Tokyo (JP); Masayuki Aota, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 358 days.

(21) Appl. No.: 15/073,877

(22) Filed: Mar. 18, 2016

(65) Prior Publication Data

US 2017/0130831 A1    May 11, 2017

(30) Foreign Application Priority Data

Nov. 11, 2015 (JP) .................... 2015-220892

(51) Int. Cl.
*F16H 61/32* (2006.01)

(52) U.S. Cl.
CPC ....... *F16H 61/32* (2013.01); *F16H 2061/326* (2013.01)

(58) Field of Classification Search
CPC .... F16H 61/32; F16H 2061/326; F16H 57/08; F16H 1/28; F16H 57/04
See application file for complete search history.

(56) References Cited

U.S. PATENT DOCUMENTS

| | | | |
|---|---|---|---|
| 7,073,483 B1 * | 7/2006 | Kurita | F02D 9/1065 123/337 |
| 9,759,316 B2 * | 9/2017 | Suzuki | F16H 61/32 |
| 2006/0163025 A1 * | 7/2006 | Hori | F16H 61/24 192/219.5 |
| 2006/0213301 A1 * | 9/2006 | Mizuguchi | B63H 20/20 74/335 |
| 2007/0046243 A1 * | 3/2007 | Hori | F16H 61/32 318/630 |
| 2008/0099266 A1 * | 5/2008 | Hiroi | B60W 10/02 180/219 |
| 2008/0173121 A1 * | 7/2008 | Kimura | F16H 61/12 74/473.12 |
| 2008/0302628 A1 * | 12/2008 | Kimura | F16H 63/3433 192/220 |
| 2010/0107811 A1 * | 5/2010 | McCloy | B60K 17/3467 74/665 F |

(Continued)

FOREIGN PATENT DOCUMENTS

JP    2008-180250 A    8/2008

*Primary Examiner* — Zakaria Elahmadi
(74) *Attorney, Agent, or Firm* — Sughrue Mion, PLLC; Richard C. Turner

(57) ABSTRACT

There is provided a range switching device that can switch the shift ranges by use of a mechanical driving force source even when the motor does not normally function. The range switching device includes an output axle coupled with the shift shaft of an automatic transmission, a motor, an elastic driving device whose driving force source is elastic energy of an elastic member, and a coupling mechanism that couples the output axle, the motor, and the elastic driving device with one another; the elastic driving device has a holding mechanism in which there can be performed switching between a holding state where accumulated elastic energy is held and a releasing state where the elastic energy is released so as to drive the output axle.

11 Claims, 7 Drawing Sheets

(56) References Cited

U.S. PATENT DOCUMENTS

| | | | |
|---|---|---|---|
| 2012/0010793 A1* | 1/2012 | Ueno | F16H 63/3466 |
| | | | 701/58 |
| 2012/0234124 A1* | 9/2012 | Nozaki | F16H 61/32 |
| | | | 74/473.12 |
| 2014/0343807 A1* | 11/2014 | Maki | F16H 61/68 |
| | | | 701/51 |
| 2016/0153549 A1* | 6/2016 | Suzuki | F16H 61/0267 |
| | | | 74/473.11 |
| 2017/0152942 A1* | 6/2017 | Makino | H02K 11/30 |
| 2017/0158053 A1* | 6/2017 | Bunyan | B60K 17/344 |
| 2017/0175863 A1* | 6/2017 | Kramer | F16H 61/32 |
| 2017/0268671 A1* | 9/2017 | Fujimoto | B62M 11/06 |
| 2017/0335960 A1* | 11/2017 | Nagata | F16H 61/2807 |

* cited by examiner

RANGE SWITCHING DEVICE

INCORPORATION BY REFERENCE

The disclosure of Japanese Patent Application No. 2015-220892 filed on Nov. 11, 2015 including its specification, claims and drawings, is incorporated herein by reference in its entirety.

BACKGROUND OF THE INVENTION

The present invention relates to a range switching device in a shift-by-wire system in which the shift range of the automatic transmission of a vehicle is operated through an electric signal.

DESCRIPTION OF THE RELATED ART

In recent years, in the field of vehicle control, there has been adopted a shift-by-wire system in which based on a command of a vehicle driver, the shift rang of the automatic transmission of the vehicle is switched through an electric signal. It is desired that even when an abnormality is caused by some contributing factor, a vehicle can securely be stopped. In the case of a vehicle in which no shift-by-wire system is utilized and a conventional mechanical range switching system is mounted, the vehicle can be stopped by switching the shift lever of the automatic transmission to the parking range or by utilizing the parking brake.

In contrast, in the case of a vehicle to which the shift-by-wire system is applied, the shift range of the automatic transmission is electrically switched; therefore, when an abnormality in the power source or the electric power supply system is caused, for example, by battery exhaustion, wire breaking, or the like, it becomes difficult to switch the shift ranges of the automatic transmission. Thus, even in the case of a vehicle equipped with the shift-by-wire system, there is required a range switching device that can switch the shift ranges of the automatic transmission when an abnormality in the vehicle is caused by some contributing factor.

For example, a shift-by-wire device disclosed in Japanese Patent Application No. JP-A-2008-180250 is provided with a capacitor for storing electric power to be supplied to a range control means that controls the motor, as a method of switching the shift range of the automatic transmission when an abnormality is caused in the electric power supply system; therefore, even when an abnormality is caused in the battery or in the electric power supply system, the motor can switch the automatic transmission to the parking range at least once, by use of electric power stored in the capacitor. As a result, the vehicle is safely and securely stopped.

SUMMARY OF THE INVENTION

However, because the shift-by-wire device disclosed in JP-A-2008-180250 is configured in such a way that even at a time of emergency, range switching is implemented by a motor, a capacitor, which is utilized only at a time of emergency, needs to be provided; furthermore, the capacitor should be a high-performance one that can supply electric power with which the motor normally functions. Accordingly, there has been a problem that the cost increases.

Thus, there is provided a range switching device that can switch the shift ranges by use of a mechanical driving force source even when the motor does not normally function.

A range switching device according to the present invention includes an output axle coupled with a shift shaft of an automatic transmission that switches shift ranges, a motor, an elastic driving device whose driving force source is elastic energy accumulated in an elastic member, and a coupling mechanism that couples the output axle, the motor, and the elastic driving device with one another in such a way that the output axle, the motor, and the elastic driving device can transmit driving force to one another; the elastic driving device has a holding mechanism in which there can be performed switching between a holding state where the elastic energy accumulated by use of driving force of the motor, which is transmitted through the intermediary of the coupling mechanism, is held and a releasing state where the elastic energy is released so as to drive the output axle.

In the range switching device according to the present invention, it is made possible that at a normal time, the output axle is rotated by the motor so that the shift ranges are switched. Moreover, at the normal time, elastic energy is accumulated in the elastic member by use of the driving force of the motor and hence the holding mechanism is turned to the holding state where the elastic energy is held, so that provision can be made for a time of abnormality. In contrast, when the motor does not normally function, the state of the holding mechanism of the elastic driving device is switched to the releasing state so that the output axle is rotated by the elastic energy of the elastic member; thus, the shift ranges can be switched. As a result, even when the motor does not normally function, the shift ranges can be switched by use of the elastic driving device whose driving force source is a mechanical elastic member.

The foregoing and other object, features, aspects, and advantages of the present invention will become more apparent from the following detailed description of the present invention when taken in conjunction with the accompanying drawings.

DETAILED DESCRIPTION OF THE EMBODIMENTS

Embodiment 1

Figure 1:
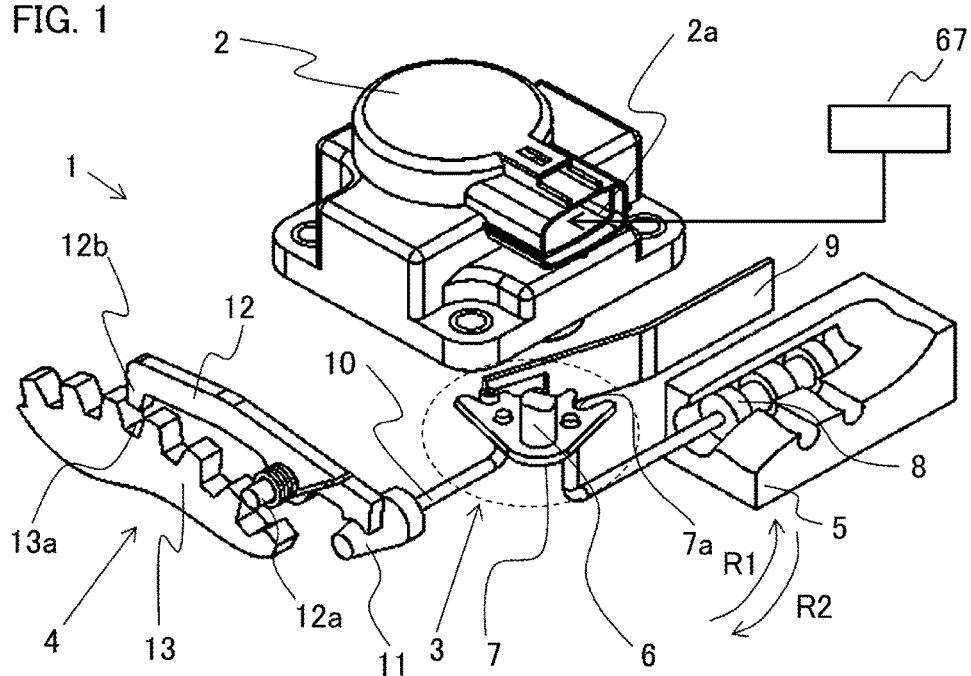
FIG. 1 is a schematic configuration diagram of a shift range switching system provided with a range switching device according to Embodiment 1 of the present invention.

A range switching device 2 according to Embodiment 1 will be explained with reference to the drawings. The range switching device 2 is coupled with a shift shaft 6 that switches the shift range of an automatic transmission mounted in a vehicle. FIG. 1 schematically illustrates the configuration of a shift range switching system 1 in which the range switching device 2 is integrated. The shift range switching system 1 includes the range switching device 2, a detent mechanism 3, a parking mechanism 4, a valve body 5, and a request range inputting device 67. FIG. 1 illustrates only the principal parts, of the automatic transmission, that relates to the shift range switching system 1.

The request range inputting device 67 is a device that accepts a shift range (a request range) that is requested by a vehicle driver. In other words, the vehicle driver operates the request range inputting device 67 so as to input a desired shift range, which is to be realized, to the automatic transmission. The shift ranges to be accepted by the request range inputting device 67 include at least a parking range (P range), a reverse range (R range), a neutral range (N range), and a drive range (D range). The request range inputting device 67 may be a position sensor that detects the operation position of the shift lever or may be formed of a switch.

The shift ranges, of the automatic transmission, that can be switched by the shift shaft 6 include at least the parking range, the reverse range, the neutral range, and the drive range. In Embodiment 1, the shift ranges, of the automatic transmission, that can be switched by the shift shaft 6 are the parking range, the reverse range, the neutral range, and the drive range.

The output signal of the request range inputting device 67 is inputted to the range switching device 2 by way of the connector 2a. Although the details will be described later, the range switching device 2 performs rotation drive of the shift shaft 6 of the automatic transmission so that a request range detected based on the output signal of the request range inputting device 67 is realized by the automatic transmission.

A sector-shaped detent plate 7 is coupled with the shift shaft 6; the rotation angle of the detent plate 7 changes in proportion to the rotation angle of the shift shaft 6. The shift shaft 6 and the detent plate 7 rotate in a first rotation direction R1 or in a second rotation direction R2 with in a preliminarily set allowable angle range (in this example, approximately 30°). The second rotation direction R2 is opposite to the first rotation direction R1. A spool valve 8 in the valve body 5 is mounted in the detent plate 7 in such a way as to move along with the detent plate 7; in accordance with the rotation angle of the detent plate 7, the axial direction position of the spool valve 8 changes. When the detent plate 7 rotates in the first rotation direction R1 or in the second rotation direction R2 with the allowable angle range, the spool valve 8 travels toward an axial-direction first side or an axial-direction second side, which is opposite to the axial-direction first side, within a predetermined range. The valve body 5 is a hydraulic pressure circuit for forming gear steps in the automatic transmission; the hydraulic path corresponding to each of the shift ranges (P, R, N, and D) is selected by changing the axial-direction position of the spool valve 8. Accordingly, the hydraulic path in the valve body 5 is switched to the one corresponding to each of the shift ranges in accordance with the respective rotation angles of the shift shaft 6 and the detent plate 7.

In the sector front end of the detent plate 7, recesses 7a are provided at the respective angles corresponding to the shift ranges. A detent spring 9 fixed to the valve body 5 functions as a plate spring and the front end of the detent spring 9 presses the recess 7a, so that the rotation angle of the detent plate 7 is positioned to the shift range corresponding to the recess 7a that engages with the front end of the detent spring 9. When rotation driving force transmitted from the range switching device 2 makes the detent plate 7 rotate, the recesses 7a that engage with the front end of the detent spring 9 are changed and hence the shift range of the automatic transmission is switched. As described above, when the rotation driving force of the range switching device 2 makes the respective rotation angles of the shift shaft 6 and the detent plate 7 change, the shift range of the automatic transmission is switched to the one corresponding to the rotation angle. In Embodiment 1, as the shift shaft 6 rotates from the end of the allowable angle range in the second rotation direction R2 toward the end of the allowable angle range in the first rotation direction R1, the shift range is switched to the drive range, the neutral range, the reverse range, and the parking range, in that order.

The parking mechanism 4 includes a parking rod 10 coupled with the detent plate 7, a conical unit 11 provided at the front end of the parking rod 10, a parking pole 12, and a parking gear 13. In accordance with the rotation angle of the detent plate 7, the axial-direction position of the parking rod 10 changes. When the axial-direction position thereof changes, the conical unit 11 provided at the front end of the parking rod 10 makes the parking pole 12 move up and down in a seesaw manner with respect to a rotation axle 12a. When the detent plate 7 rotates up to the end position thereof, in the first rotation direction R1, that corresponds to the parking range, a protrusion 12b of the parking pole 12 engages with a recess 13a of the parking gear 13; then, the rotation of the parking gear 13 is locked; thus, the rotation of the output axle, of the automatic transmission, that is coupled with a wheel is locked. In contrast, when the detent plate 7 rotates from the end position thereof, in the first rotation direction R1, that corresponds to the parking range toward the end in the second rotation direction R2, the protrusion 12b of the parking pole 12 is released from the recess 13a of the parking gear 13; then, the locking of the rotation of the parking gear 13 is cancelled.

As described above, in the shift range switching system 1, the rotation driving force of the range switching device 2 makes the detent plate 7 rotate in the first rotation direction R1 or in the second rotation direction R2 within the allowable angle range through the intermediary of the shift shaft 6, so that the axial-direction position of the spool valve 8 in the valve body 5 is changed; thus, the shift range of the automatic transmission can be switched and the rotation of the wheel can be locked in the parking range.

Figure 2:
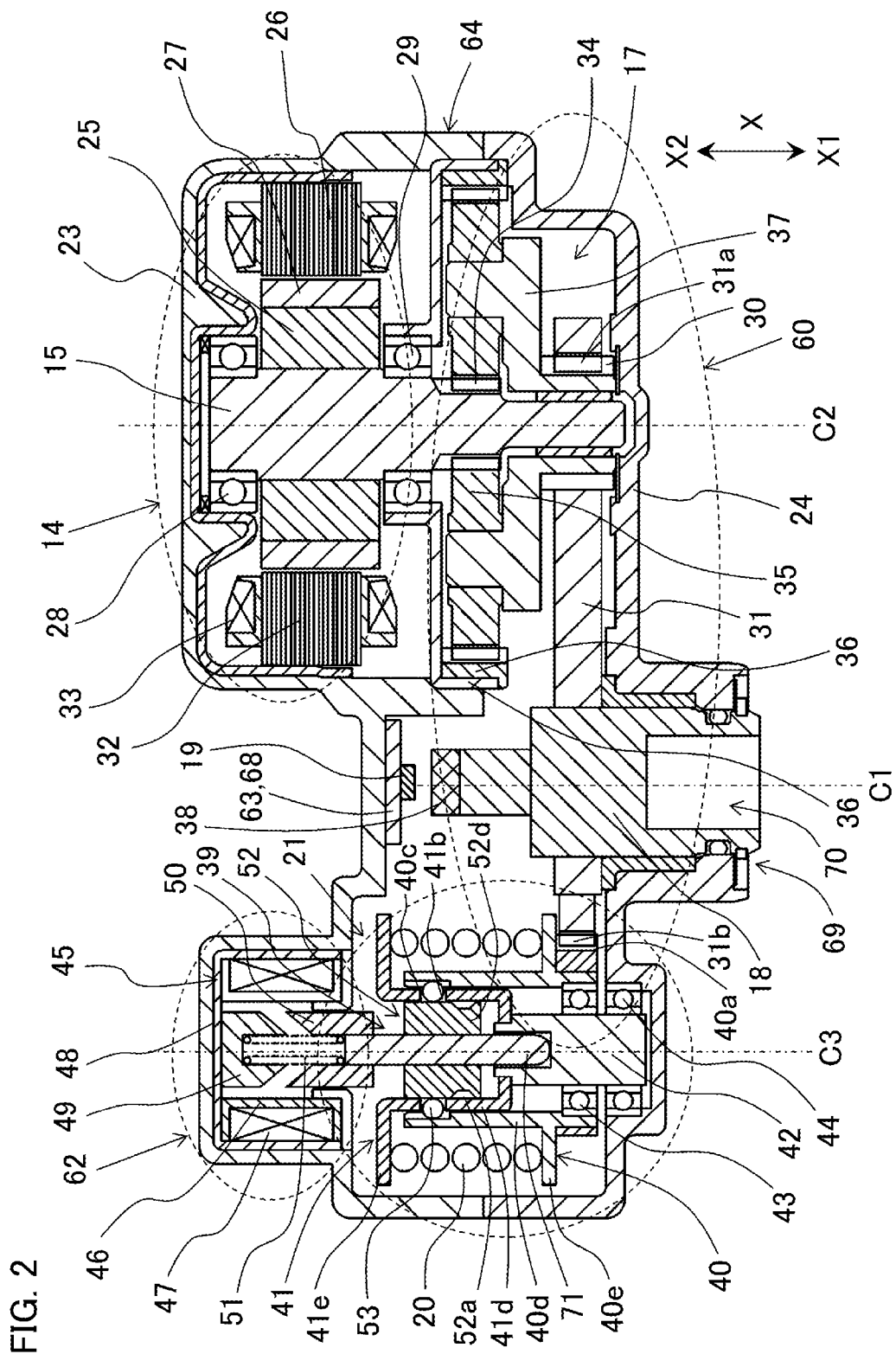
FIG. 2 is a cross-sectional view of the range switching device according to Embodiment 1 of the present invention at a time when a holding mechanism is in a holding state.
Figure 3:
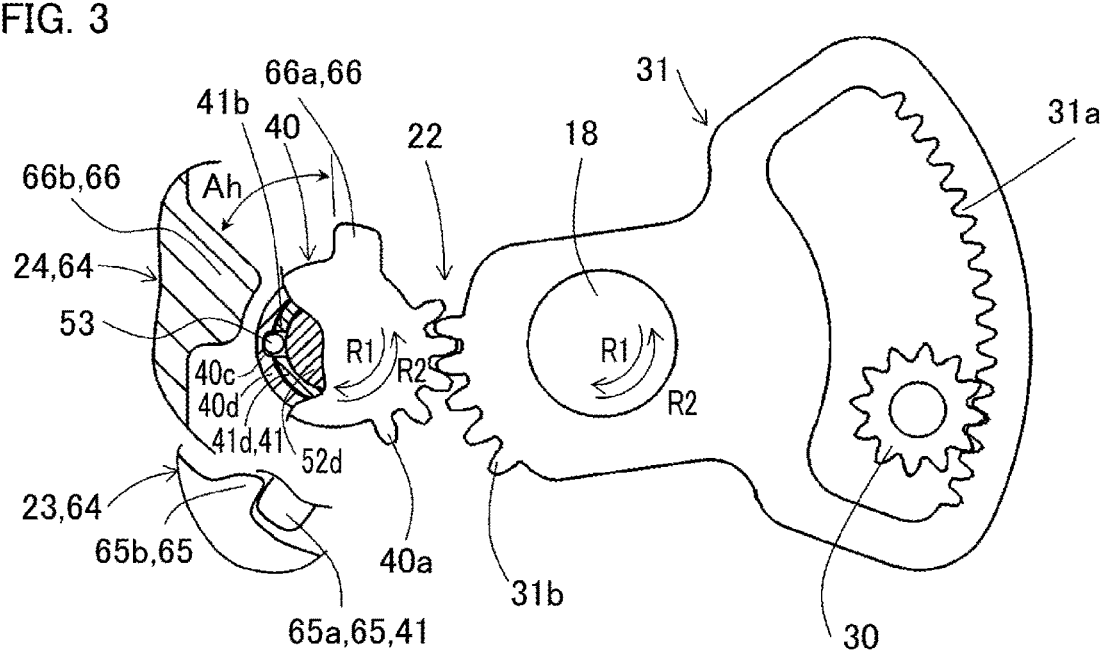
FIG. 3 is a view illustrating the principal parts of the range switching device according to Embodiment 1 of the present invention at a time when the holding mechanism is in the holding state and the shift range is in a drive range.
Figure 4:
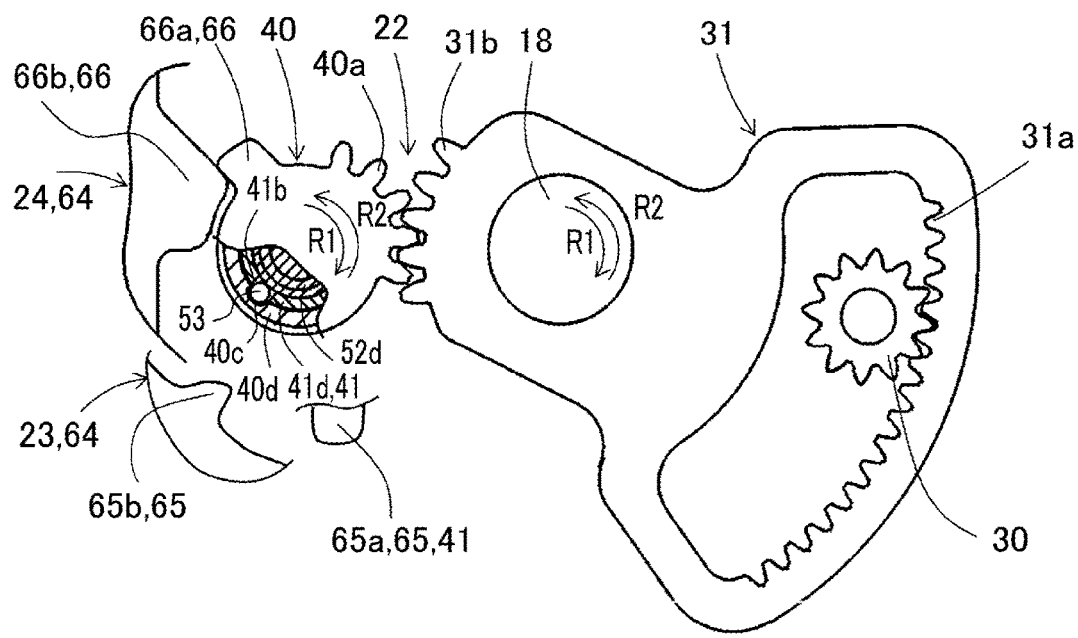
FIG. 4 is a view illustrating the principal parts of the range switching device according to Embodiment 1 of the present invention at a time when the holding mechanism is in the holding state and the shift range is in a parking range.
Figure 5:
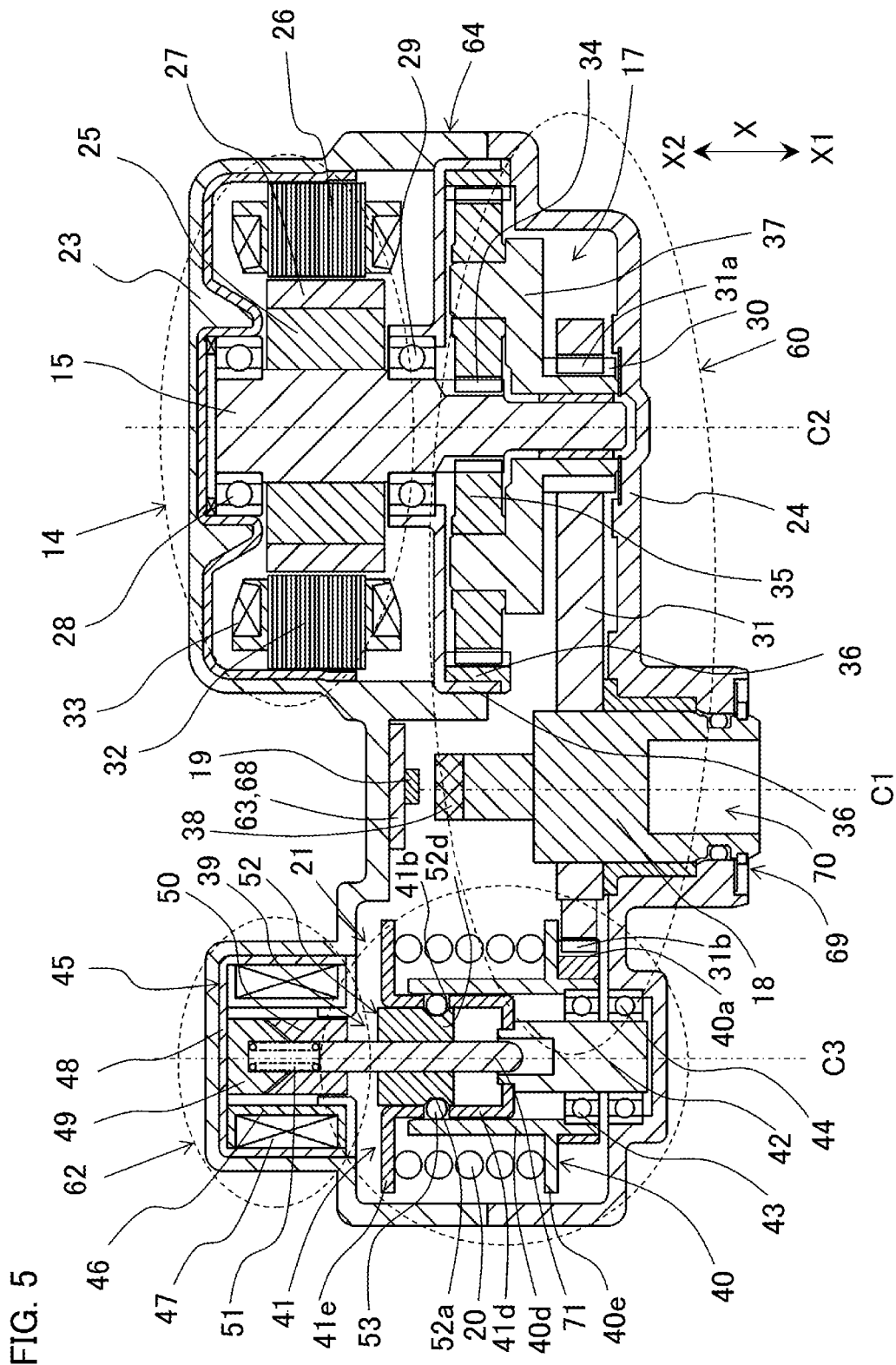
FIG. 5 is a cross-sectional view of the range switching device according to Embodiment 1 of the present invention at a time when the holding mechanism is in a releasing state.
Figure 6:
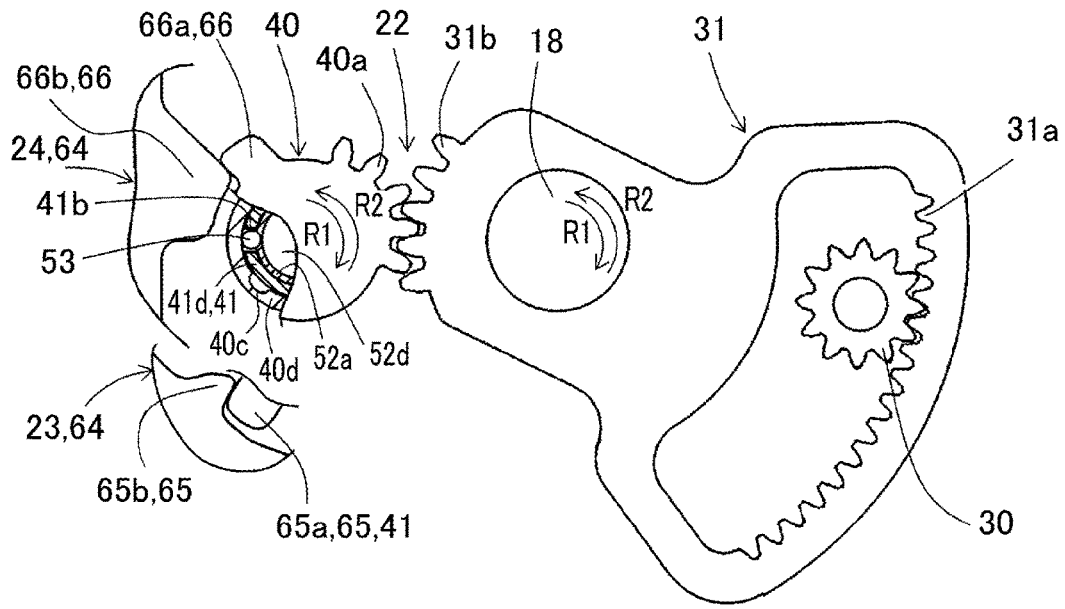
FIG. 6 is a view illustrating the principal parts of the range switching device according to Embodiment 1 of the present invention at a time when the holding mechanism is in the releasing state and the shift range is in the parking range.

Next, the range switching device 2 will be explained in detail. FIG. 2 illustrates a cross-sectional view of the range switching device 2 at a time when a holding mechanism 39 is in a holding state. FIG. 3 illustrates the principal parts of the range switching device 2 viewed from the axial-direction first side X1 to the axial-direction second side X2 at a time when the holding mechanism 39 is in the holding state and an output axle 18 is rotated up to the rotation angle corresponding to the drive range. The axial-direction second side X2 is opposite to the axial-direction first side X1. FIG. 4 illustrates the principal parts of the range switching device 2 viewed from the axial-direction first side X1 to the axial-direction second side X2 at a time when the holding mechanism 39 is in the holding state and the output axle 18 is rotated up to the rotation angle corresponding to the parking range. FIG. 5 illustrates a cross-sectional view of the range switching device 2 at a time when the holding mechanism 39 is in a releasing state. FIG. 6 illustrates the principal parts of the range switching device 2 viewed from the axial-direction first side X1 to the axial-direction second side X2 at a time when the holding mechanism 39 is in the releasing state and the output axle 18 is rotated up to the rotation angle corresponding to the parking range.

The range switching device 2 includes the output axle 18 coupled with the shift shaft 6 of the automatic transmission that switches shift ranges, the motor 14, an elastic driving device 21 whose driving source is elastic energy accumulated in an elastic member 20, and a coupling mechanism 60 that couples the output axle 18, the motor 14, and the elastic driving device 21 in such a way that they can transmit driving force to one another.

The elastic driving device 21 has the holding mechanism 39 in which there can be performed switching between the holding state where elastic energy accumulated by use of driving force of the motor 14, which is transmitted through the intermediary of the coupling mechanism 60, is held and the releasing state where the elastic energy is released so as to drive the output axle 18.

In this configuration, it is made possible that at a normal time, the output axle 18 is rotated by the motor 14 so that the shift ranges are switched. In contrast, when the motor 14 does not normally function, the state of the holding mechanism 39 of the elastic driving device 21 is switched to the releasing state so that the output axle 18 is rotated by the elastic energy of the elastic member 20; thus, the shift ranges can be switched. After that, when the state of the motor 14 is restored to a state where it functions normally, elastic energy is accumulated again in the elastic member 20 by use of driving force of the motor 14, so that the state of the holding mechanism 39 can be switched to the one where the elastic energy is held.

In Embodiment 1, the range switching device 2 includes an electric actuator 62 that drives the holding mechanism 39 so that the state of the holding mechanism 39 becomes the holding state or the releasing state and a controller 63 that controls the motor 14 and the electric actuator 62. The controller 63 selectively implements an electric driving mode where controls the motor 14 so that the output axle 18 is rotated by the driving force of the motor 14 and controls the electric actuator 62 so that the state of the holding mechanism 39 becomes the holding state or an elastic driving mode where stops the control of the motor 14 and controls the electric actuator 62 so that the state of the holding mechanism 39 becomes the releasing state and hence the output axle 18 is rotated by the elastic energy.

In this configuration, the electric actuator 62 and the controller 63 automatically makes it possible that the electric driving mode or the elastic driving mode is selectively implemented; therefore, the range switching device 2 can be much more convenient and safer to the vehicle driver.

In Embodiment 1, the rotation axial center C1 of the output axle 18, the rotation axial center C2 of the motor 14, and the rotation axial center C3 of the elastic driving device 21 are arranged on different axes and in such a way as to be in parallel with one another. The axial direction X is a direction that is parallel to the axial centers C1, C2, and C3.

The range switching device 2 is provided with a device case 64 that contains the output axle 18, the motor 14, the elastic driving device 21, the coupling mechanism 60, the electric actuator 62, the controller 63, and the like and that supports them. In Embodiment 1, the device case 64 includes a bottomed tubular housing 23 that is opened toward the axial-direction first side X1 and a cover 24 that covers the opening, toward the axial-direction first side X1, of the housing 23 and that is fixed to the housing 23. In the cover 24, a through-hole 69 that penetrates the cover 24 is formed. The output axle 18 penetrates the through-hole 69 toward the axial-direction first side X1 and is exposed to the outside of the device case 64. A coupling recess 70 to be coupled with the shift shaft 6 is formed in the end, at the axial-direction first side X1, of the output axle 18. The coupling recess 70 is a 2-corner-chamferred recess; the 2-corner-chamferred coupling portion of the shift shaft 6 is inserted into the coupling recess 70 so that the shift shaft 6 and the coupling recess 7 are coupled with each other in such a way as to rotate integrally. The case portion of the connector 2a is formed in the device case 64 (housing 23) (refer to FIG. 1). The respective connection terminals of the connector 2a are connected with a connection wire for inputting the output signal of the request range inputting device 67, a power supplying wire from a DC power source 85, a communication wire for communicating with an external controller, and the like.

The motor 14 has a cylindrical tubular stator 26 fixed to the device case 64 (housing 23) and a cylindrical tubular rotor 25 that is disposed at the radial-direction inner side of the stator 26 and is pivotably supported by the device case 64 through the intermediary of a rotor axle 15 by use of rolling bearings 28 and 29. In Embodiment 1, the motor 14 is a brushless permanent magnet synchronous motor; a coil 33 is wound around the stator 26, and a permanent magnet 27 is fixed to the rotor 25 (the outer circumferential surface of the rotor 25, in this example). A stator core 32 is provided with a plurality of stator teeth that protrude toward the radial-direction outer side. The coil 33 is wound between the stator teeth and forms a three-phase connection including three-phase coils, i.e., U-phase, V-phase, and W-phase coils.

The coupling mechanism 60 has a deceleration gear mechanism 17 that decelerates the rotation speed of the motor 14 and that amplifies the torque of the motor 14 and transmits the torque to the output axle 18. In Embodiment 1, the deceleration gear mechanism 17 is formed of an epicyclic gear deceleration mechanism and a spur gear deceleration mechanism. The epicyclic gear deceleration mechanism includes a carrier 37 that supports the plurality of epicyclic gears 35 so that the epicyclic gears 35 can perform rotation and revolution, an outer-tooth sun gear 34 that engages with the epicyclic gear 35 from the radial-direction inner side, and an inner-tooth ring-shaped gear 36 that engages with the epicyclic gear 35 from the radial-direction outer side. The sun gear 34 is formed on the outer circumferential surface of the rotor axle 15 extending toward the axial-direction first side X1; the carrier 37 is coupled with a small gear 30 in the spur gear deceleration mechanism; the ring-shaped gear 36 is fixed to the device case 64 (housing 23).

As illustrated in FIG. 3 and the like, the spur gear deceleration mechanism has the small gear 30 coupled with the carrier 37 and a large gear 31 that engage with the small gear 30 and is coupled with the output axle 18. The large gear 31 is a gear having a great number of teeth per unit angle in comparison with the small gear 30. The large gear 31 is a sector-shaped gear in which teeth 31a are formed in the angle range corresponding to the allowable angle range of the output axle 18 and the shift shaft 6. In this example, the large gear 31 is an inner-tooth gear; however, the large gear 31 may be an outer-tooth gear.

Figure 7:
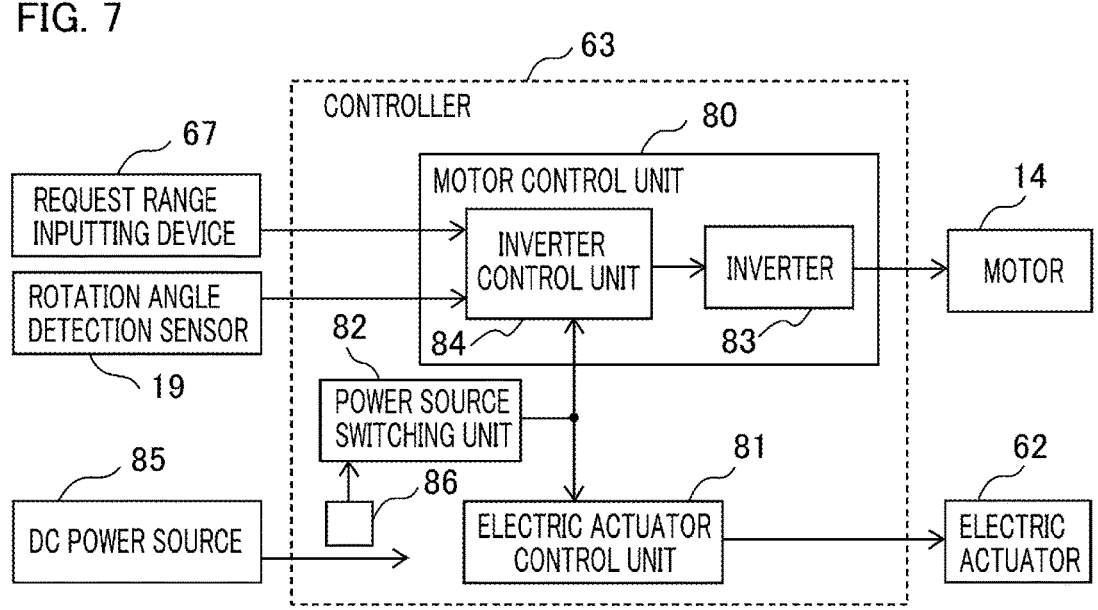
FIG. 7 is a block diagram of a controller according to Embodiment 1 of the present invention.

A magnet 38 is provided on the end, at the axial-direction second side X2, of the output axle 18; a rotation angle detection sensor 19 that detects the rotation angle of the output axle 18 is provided at the axial-direction second side X2 of the magnet 38. The rotation angle detection sensor 19 is fixed on a substrate 68 in the controller 63. As represented in FIG. 7, the output signal of the rotation angle detection sensor 19 is inputted to the controller 63. Based on the output signal of the rotation angle detection sensor 19, the controller 63 detects the direction of the magnetic flux of the magnet 38 and hence detects the rotation angle of the output axle 18. Then, the controller 63 detects the shift range corresponding to the rotation angle of the output axle 18. The controller 63 in which a plurality of electronic components are mounted on the substrate 68 is fixed to the inside of the device case 64; however, only part of the substrate 68 is illustrated in FIGS. 2 and 5. The controller 63 may be provided, as a separate body, outside the device case 64.

The coupling mechanism 60 has a gear mechanism 22 that transmits the rotation driving force, produced by the energy of the elastic driving device 21, to the output axle 18 (refer to FIG. 3). The gear mechanism 22 includes outer teeth gear 40a formed in an output member 40, described later, of the elastic driving device 21 and outer teeth 31b formed in the material of the sector-shaped large gear 31; the outer tooth 40a of the output member 40 and the outer tooth 31b of the large gear 31 engage with each other. The outer teeth 40a of the output member 40 and the outer teeth 31b of the large gear 31 are formed in the angle range corresponding to the allowable angle range of the output axle 18 and the shift shaft 6. The gear mechanism 22 reverses the rotation direction of the elastic driving device 21 (the output member 40) and then transmits the rotation driving force to the output axle 18. That is to say, the respective rotation directions of the elastic driving device 21 and the output axle 18 are opposite to each other; when the elastic driving device 21 (the output member 40) is rotated in the second rotation direction R2, the shift range of the automatic transmission becomes the parking range.

The elastic driving device 21 biases the output axle 18 by elastic energy toward a predetermined rotation driving direction at a time when the holding mechanism 39 is in the releasing state; the elastic driving device 21 does not transmit the elastic energy to the output axle 18 at a time when the holding mechanism 39 is in the holding state. In Embodiment 1, the direction of rotation driving, produced by the elastic driving device 21, of the output axle 18, is the first rotation direction R1, which is the direction toward the parking range; in the elastic driving mode, the elastic driving device 21 rotation-drives the output axle 18 by elastic energy up to the rotation angle corresponding to the parking range.

In this configuration, when the motor 14 does not normally function, the shift range is switched to the parking range by the elastic driving device 21; therefore, the vehicle can safely be stopped.

The holding mechanism 39 is provided with the output member 40 that is locked at a first end of the elastic member 20 and is coupled with the coupling mechanism 60, a base member 41 that is locked at a second end, of the elastic member 20, which is at the opposite side of the first end, and that is supported by the device case 64 containing the elastic driving device 21, a locking member 53 that is locked with the base member 41 and the output member 40 so as to prevent relative movement between the base member 41 and the output member 40 at a time when due to the driving force of the motor 14, elastic energy is accumulated in the elastic member 20, and a lock releasing member 52 that releases locking by the locking member 53.

In the case where the locking member 53 engages with the base member 41 and the output member 40, the holding mechanism 39 is in the holding state; in the case where the lock releasing member 52 releases engagement of the locking member 53, the holding mechanism 39 is in the releasing state.

In Embodiment 1, the elastic member 20 is a torsion spring that twists around the rotation axial center C3 of the elastic driving device 21. The output member 40 has a cylindrical tubular portion 40d that is disposed at the inner side in the radial direction of the rotation axial center C3 with respect to the elastic member 20 and can rotate in the circumferential direction of the rotation axial center C3. The base member 41 has a cylindrical tubular portion 41d having an outer circumferential surface that slides on the inner circumferential surface of the tubular portion 40d of the output member 40; the base member 41 can rotate in the circumferential direction of the rotation axial center C3. The lock releasing member has a cylindrical tubular portion 52d having an outer circumferential surface that slides on the inner circumferential surface of the tubular portion 41d of the base member 41; the lock releasing member 52 can travel to the axial direction X. The electric actuator 62 biases the lock releasing member 52 toward the axial-direction first side X1 or the axial-direction second side X2 of the rotation axial center C3.

The base member 41 has a cylindrical columnar axle portion 42 that extends from the end, at the axial-direction first side X1, of the tubular portion 41d toward the axial-direction first side X1 and that has a diameter smaller than that of the tubular portion 41d. The end, at the axial-direction first side X1, of the axle portion 42 is supported through the intermediary of the rolling bearing 44 by a boss portion formed in the device case 64 (the cover 24), in such a way as to be pivotable around the rotation axial center C3. The base member 41 has an annular-disk flange portion 41e that extends from the end, at the axial-direction second side X2, of the tubular portion 41d toward the radial-direction outer side. The second end of the elastic member 20 is locked by the flange portion 41e.

The outer teeth 40a of the foregoing gear mechanism 22 are formed in a predetermined angle range on the outer circumferential surface of the end, at the axial-direction first side X1, of the tubular portion 40d of the output member 40. The inner circumferential surface of the end, at the axial-direction first side X1, of the tubular portion 40d of the output member 40 is supported through the intermediary of the rolling bearing 43 by the outer circumferential surface of the axle portion 42 of the base member 41 in such a way as to be relatively pivotable around the rotation axial center C3. Accordingly, the tubular portion 40d of the output member 40 is pivotably supported by the device case 64 through the intermediaries of the rolling bearing 43, the axle portion 42 of the base member 41, and the rolling bearing 44. The output member 40 has an annular-disk flange portion 40e that extends toward the radial-direction outer side from the axial-direction second side X2 of the portion where the outer teeth 40a are formed. The first end of the elastic member 20 is locked by the flange portion 40e.

The lock releasing member 52 has a cylindrical columnar coupling axle portion 71 fixed to the inner circumferential surface of the tubular portion 52d. The end, at the axial-direction second side X2, of the coupling axle portion 71 is coupled with a plunger 50 of the electric actuator 62, described later.

The locking member 53 is formed in the shaped of a sphere. In the tubular portion 41d of the base member 41, a base member through-hole 41b that penetrates the tubular portion 41d in the radial direction of the rotation axial center C3 is formed. An output member recess 40c that recesses toward the radial-direction outer side is formed in the inner circumferential surface of the tubular portion 40d of the output member 40. A ring-shaped recess 52a that recesses toward the radial-direction inner side and extends in the circumferential direction is formed in the outer circumferential surface of the tubular portion 52d of the lock releasing member 52.

A plurality of the locking members 53 are provided (for example, in fours). The base member through-holes 41b are provided in a number the same as the number of the locking members 53 and are arranged at the same positions in the axial direction in such a way as to be spaced apart from one another in the radial direction. The output member recesses 40c are provided in a number the same as the number of the locking members 53 and are arranged at the same positions in the axial direction in such a way as to be spaced apart from one another in the radial direction.

As illustrated in FIG. 3, the position where each of the output member recesses 40c is formed is the one where the output member 40 is twisted by a predetermined holding angle Ah in the circumferential direction (in this example, toward the first rotation direction R1) and the output member recess 40c communicates with the corresponding base member through-hole 41b. As illustrated in FIG. 5, the position where the ring-shaped recess 52a is formed is the one where the ring-shaped recess 52a communicates with the corresponding base member through-hole 41b at a time when the lock releasing member 52 has traveled up to the end position thereof at the axial-direction second side X2. The holding angle Ah is set to the angle corresponding to the allowable angle range.

At first, the case where the state of the holding mechanism 39 turns to the releasing state will be explained. As illustrated in FIGS. 5 and 6, when due to the biasing force of the electric actuator 62, the lock releasing member 52 travels up to the end position thereof at the axial-direction second side X2, the sphere-shaped locking member 53 travels to a releasing position across the base member through-hole 41b and the ring-shaped recess 52a that communicate with each other so as to enable the base member 41 and the output member 40 to perform relative pivoting and to hold the lock releasing member 52 at the end position thereof at the axial-direction second side X2. The state of the holding mechanism 39 turns to the releasing state; the elastic energy of the elastic member 20 biases the output member 40 in the second rotation direction R2 with respect to the base member 41 (the device case 64). After the state of the holding mechanism 39 has turned to the releasing state, the holding state is not restored unless the driving force of the motor 14 twists the output member 40 by the holding angle Ah, even when the electric actuator 62 biases the lock releasing member 52 toward the axial-direction first side X1. As illustrated in FIG. 6, the output member recess 40c has a shape (in this example, the shape of a semicircle) in which the shape of a cross section thereof taken by a plane that is perpendicular to the axial direction X gradually spreads toward the radial-direction inner side; in the holding state illustrated in FIGS. 3 and 4, the output member recess 40c presses the sphere-shaped locking member 53 toward the radial-direction inner side by the circumferential-direction biasing force of the elastic member 20. The pressing force toward the radial-direction inner side makes the locking member 53 travel toward the radial-direction inner side from the engagement position, describe later, to the releasing position.

Next, the case where the state of the holding mechanism 39 turns to the holding state will be explained. In the case where while the lock releasing member 52 is held at the end of the axial-direction second side X2 by the locking member 53 (refer to FIG. 5) and is biased toward the axial-direction first side X1 by the electric actuator 62, the output member 40 twists by the holding angle Ah in the circumferential direction (in this example, in the first rotation direction R1) with respect to the base member 41, the sphere-shaped locking member 53 travels, as illustrated in FIG. 3, to a holding position across the output member recess 40c and the base member through-hole 41b that communicate with each other, so as to prevent the base member 41 and the output member 40 from performing relative pivoting and to enable the lock releasing member 52 to travel toward the axial-direction first side X1. After the locking member 53 travels to the holding position, the biasing force of the electric actuator 62 makes the lock releasing member 52 travel to the end at the axial-direction first side X1, as illustrated in FIG. 2. The state of the holding mechanism 39 turns to the holding state; the elastic energy that has accumulated in the elastic member 20 due to the twisting of the holding angle Ah is held between the output member 40 and the base member 41 and is not transmitted to the output axle 18. As illustrated in FIG. 2, the ring-shaped recess 52a has a shape (in this example, the shape of an isosceles trapezoid) in which the shape of a cross section thereof taken by a plane that passes through the rotation axial center C3 gradually spreads toward the radial-direction outer side; in the releasing state illustrated in FIG. 5, the ring-shaped recess 52a presses the sphere-shaped locking member 53 toward the radial-direction outer side by the biasing force, toward the axial-direction first side X1, of the electric actuator 62. The pressing force toward the radial-direction outer side makes the locking member 53 travel toward the radial-direction outer side from the releasing position to the engagement position.

The electric actuator 62 includes the plunger 50 formed of a magnetic material coupled with the lock releasing member 52, a plunger elastic member 51 that biases the plunger 50 toward the axial-direction first side X1, and an electromagnetic solenoid 45 that attracts the plunger 50 toward the axial-direction second side X2 at a time of energization. Accordingly, when the controller 63 makes electric power supplied to the electric actuator 62, the attractive force of the electromagnetic solenoid 45 biases the lock releasing member 52 toward the axial-direction second side X2; when the controller 63 does not make electric power supplied to the electric actuator 62, the plunger elastic member 51 biases the lock releasing member 52 toward the axial-direction first side X1. The electromagnetic solenoid 45 is designed in such a way as to generate electromagnetic force that can attract the lock releasing member 52 to the end position thereof at the axial-direction second side X2 while resisting the elastic force of the plunger elastic member 51, even when the supply voltage drops.

The electromagnetic solenoid 45 is formed in such a way that a coil 47 is wound around the bobbin 46. The electric actuator 62 includes a yoke 48 that covers the outside of the electromagnetic solenoid 45 and a core 49 that is disposed at the axial-direction second side X2 of the space, at the radial-direction inner side, of the electromagnetic solenoid 45. The power supplying source for the electromagnetic solenoid 45 may be an electric power supply system the same as that for the motor 14 (in this example, the DC power source 85) or may be a separately provided electric power supply system. The controller 63 performs on/off-control of the power supply from the power supplying source to the electromagnetic solenoid 45.

The output member 40 and the device case 64 have respective output member stopping portions 66 that restrict at a predetermined output member angle the rotation, with respect to the device case 64, of the output member 40 in an elastic bias direction (in this example, in the second rotation direction R2) in which the elastic member 20 biases the output member 40. The base member 41 and the device case 64 have respective base member stopping portions 65 that restrict at a predetermined base member angle the rotation, with respect to the device case 64, of the base member 41 in an elastic bias direction (in this example, in the first rotation direction R1) in which the elastic member 20 biases the base member 41.

In Embodiment 1, as illustrated in FIGS. 3, 4, and 6, the output member stopping portions 66 include an output protrusion 66a provided in the output member 40 (the end, at the axial-direction first side X1, of the tubular portion 40d) and a case protrusion 66b provided in the device case 64 (the cover 24). The output protrusion 66a abuts on the case protrusion 66b, so that the rotation of the output member 40 with respect to the device case 64 is restricted. The base member stopping portions 65 include a base protrusion 65a provided in the base member 41 (the flange portion 41e) and a case protrusion 65b provided in the device case 64 (the housing 23). The base protrusion 65a abuts on the case protrusion 65b, so that the rotation of the base member 41 with respect to the device case 64 is restricted.

The elastic bias direction in which the elastic member 20 biases the output member 40 is the second rotation direction R2; as illustrated in FIGS. 4 and 6, the output member stopping portions 66 restrict the rotation, with respect to the device case 64, of the output member 40 in the second rotation direction R2, at the output member angle corresponding to the parking range. The elastic bias direction in which the elastic member 20 biases the base member 41 is the first rotation direction R1; as illustrated in FIG. 3, when the holding mechanism 39 is in the holding state and the base member 41 and the output member 40 integrally rotate, the base member stopping portions 65 restrict the rotation, with respect to the device case 64, of the base member 41 in the first rotation direction R1, at the base member angle corresponding to the drive range. As illustrated in FIG. 6, even when the holding mechanism 39 is in the releasing state, the base member stopping portions 65 restrict the rotation, with respect to the device case 64, of the base member 41 in the first rotation direction R1 at the base member angle and makes the rotation driving force of the motor 14 rotate the output member 40 in the first rotation direction R1, so that elastic energy is accumulated in the elastic member 20.

Accordingly, when the holding mechanism 39 is in the releasing state, it is made possible that output member stopping portions 66 restrict the rotation of the output member 40, which is caused by the elastic energy in the elastic member 20, at the rotation angle corresponding to the parking range. In contrast, when the holding mechanism 39 is in the holding state, it is made possible that the base member stopping portions 65 restrict the rotation of the output member 40 (the base member 41) at the rotation angle corresponding to the drive range. When the holding mechanism 39 is in the releasing state, the base member stopping portions 65 restricts the rotation of the base member 41 and the rotation driving force of the motor 14 rotates the output member 40, so that elastic energy can be accumulated in the elastic member 20.

As described above, the controller 63 selectively implements the electric driving mode where controls the motor 14 so that the output axle 18 is rotated by the driving force of the motor 14 and controls the electric actuator 62 so that the state of the holding mechanism 39 becomes the holding state or the elastic driving mode where stops the control of the motor 14 and controls the electric actuator 62 so that the state of the holding mechanism 39 becomes the releasing state and hence the output axle 18 is rotated by the elastic energy.

In Embodiment 1, as represented in the block diagram of FIG. 7, the controller 63 includes a motor control unit 80 (or, a motor controller 80) that controls the motor 14, an electric actuator control unit 81 (or, an electric actuator controller 81) that controls the electric actuator 62, and a power source switching unit 82 (or, a power source switch 82) that commands the motor control unit 80 and the electric actuator control unit 81 to selectively implement the electric driving mode and the elastic driving mode, respectively. The DC power source 85 supplies a DC voltage to the controller 63. The output signals of the request range inputting device 67 and the rotation angle detection sensor 19 are inputted to the controller 63. The controller 63 has a voltage sensor 86 that detects the DC voltage supplied from the DC power source 85.

Based on the output signal of the request range inputting device 67, the motor control unit 80 determines the request range, which is the shift range, of the automatic transmission, that is requested by the vehicle driver, and sets the target rotation angle, which is the rotation angle, of the output axle 18, that realizes the request range. In addition, the motor control unit 80 detects the actual rotation angle of the output axle 18, based on the output signal of the rotation angle detection sensor 19. Then, the motor control unit 80 changes electric power to be supplied to the three-phase coils and hence changes the output torque (rotation driving force) of the motor 14 so that the actual rotation angle of the output axle 18 approaches the target rotation angle.

The motor control unit 80 includes an inverter 83 that coverts DC electric power supplied from the DC power source 85 into AC electric power and supplies the AC electric power to the three-phase coils of the motor 14 and an inverter control unit 84 (or, an inverter controller 84) that on/off-controls a switching device included in the inverter 83. The inverter 83 is a three-phase inverter in which a bridge circuit is configured with six switching devices such as MOSFETs (Metal Oxide Semiconductor Field Effect Transistors). The inverter control unit 84 changes AC voltage commands to be supplied to the three-phase coils by use of a publicly known vector control method or the like so that the switching devices are on/off-controlled based on the AC voltage commands.

In Embodiment 1, when the state of the holding mechanism 39 is turned to the holding state, the electric actuator control unit 81 stops the supply of electric power to the electromagnetic solenoid 45; when the state of the holding mechanism 39 is turned to the releasing state, the electric actuator control unit 81 supplies electric power to the electromagnetic solenoid 45. In the normal state where the motor 14 controls the rotation angle of the output axle 18, the supply of electric power to the electromagnetic solenoid 45 is stopped; therefore, the power consumption in the electromagnetic solenoid 45 can be reduced. In contrast, as described above, after the state of the holding mechanism 39 has been turned to the releasing state after electric power is supplied to the electromagnetic solenoid 45 and hence the lock releasing member 52 travels to the end thereof at the axial-direction second side X2, the releasing state is held even when the supply of electric power to the electromagnetic solenoid 45 is stopped. Therefore, in the case where the state of the holding mechanism 39 is turned to the releasing state, the electric actuator control unit 81 may supply electric power to the electromagnetic solenoid 45 only in a predetermined period.

In the case where it is determined that the electric driving mode is to be implemented, the power source switching unit 82 commands the motor control unit 80 to control the driving force of the motor so that the output axle 18 rotates to the rotation angle corresponding to the request range; concurrently, the power source switching unit 82 commands the electric actuator control unit 81 to stop the supply of electric power to the electromagnetic solenoid 45 so that the state of the holding mechanism 39 is turned to the holding state. In contrast, in the case where it is determined that the elastic driving mode is to be implemented, the power source switching unit 82 commands the motor control unit 80 to stop the supply of electric power to the motor 14 so that the motor 14 generates no driving force; concurrently, the power source switching unit 82 commands the electric actuator control unit 81 to supply electric power to the electromagnetic solenoid 45 so that the state of the holding mechanism 39 is turned to the releasing state.

In Embodiment 1, in the case where the supply voltage detected based on the output signal of the voltage sensor 86 is the same as or higher than a predetermined low voltage determination value, the power source switching unit 82 implements the electric driving mode; in the case where the supply voltage is lower than the low voltage determination value, the power source switching unit 82 implements the elastic driving mode. The low voltage determination value is preliminarily set to a voltage under which the motor control unit 80 cannot normally control the motor 14.

In this configuration, when due to the drop of the supply voltage, the range switching by the motor 14 cannot be implemented, controller 63 implements the elastic driving mode so that the ranges can be switched by the elastic energy of the elastic driving device 21. In contrast, in the case where the voltage supply is restored, the controller 63 implements the electric driving mode so that the motor 14 switches the ranges.

After the driving mode is turned from the elastic driving mode to the electric driving mode, the power source switching unit 82 makes the motor 14 generate driving force so that elastic energy is accumulated in the elastic member 20; concurrently, the power source switching unit 82 controls the electric actuator 62 so that the state of the holding mechanism 39 is turned to the holding state. Specifically, the power source switching unit 82 commands the motor control unit 80 to control the driving force of the motor 14 so that the output axle 18 is made to rotate from the rotation angle corresponding to the parking range to the rotation angle corresponding to the driving range and hence elastic energy is accumulated in the elastic member 20. The power source switching unit 82 commands the electric actuator control unit 81 to stop the supply of electric power to the electromagnetic solenoid 45 so that the state of the holding mechanism 39 is turned to the holding state. The power source switching unit 82 turns the state of the holding mechanism 39 to the holding state and then starts the normal electric driving mode.

Figure 8:
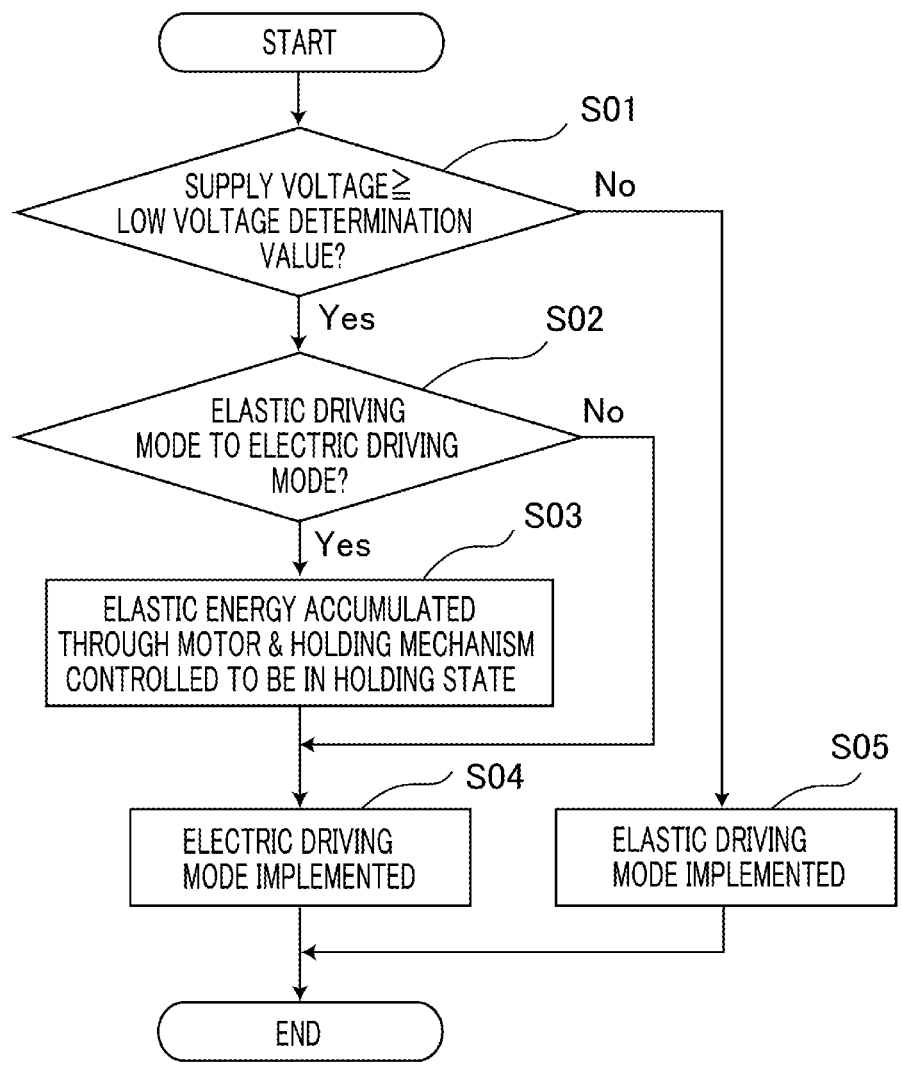
FIG. 8 is a flowchart representing the processing by the controller according to Embodiment 1 of the present invention.

The foregoing processing by the power source switching unit 82 can be configured as represented in the flowchart of FIG. 8. In the step S01, the power source switching unit 82 determines whether or not the supply voltage detected based on the output signal of the voltage sensor 86 is the same as or higher than a predetermined low voltage determination value. Then, when determining that the supply voltage is the same as or higher than the predetermined low voltage determination value (the step S01: Yes), the power source switching unit 82 determines whether or not the present timing is the one immediately after the driving mode has been turned from the elastic driving mode to the electric driving mode (the step S02). Then, in the step S03, as described above, the power source switching unit 82 makes the motor 14 generate driving force so that elastic energy is accumulated in the elastic member 20, and controls the electric actuator 62 so that the state of the holding mechanism 39 is turned to holding state. After that, in the step S04, the power source switching unit 82 implements the electric driving mode. In contrast, when determining that the supply voltage is lower than the low voltage determination value (the step S01: No), the power source switching unit 82 implements the elastic driving mode (the step S05).

Figure 9:
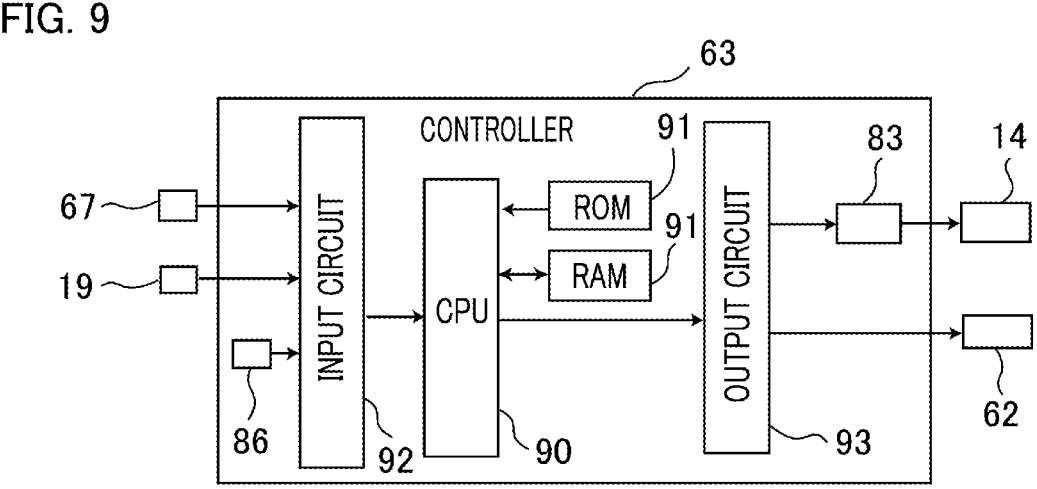
FIG. 9 is a schematic hardware configuration diagram of the controller according to Embodiment 1 of the present invention.

The respective functions of the inverter control unit 84, the electric actuator control unit 81, the power source switching unit 82, and the like included in the controller 63 are realized by processing circuits included in the controller 63. Specifically, as illustrated in FIG. 9, the controller 63 includes, as processing circuits, a computing processing unit (computer) 90 such as a CPU (Central Processing Unit), storage apparatuses 91 that exchange data with the computing processing unit 90, an input circuit 92 that inputs external signals to the computing processing unit 90, an output circuit 93 that outputs signals from the computing processing unit 90 to the outside, and the like.

As the storage apparatuses 91, there are provided a RAM (Random Access Memory) that can read data from and write data in the computing processing unit 90, a ROM (Read Only Memory) that can read data from the computing processing unit 90, and the like. Sensors and switches such as the request range inputting device 67, the rotation angle detection sensor 19, and the voltage sensor 86 are connected with the input circuit 92; the input circuit 92 is provided with an A/D converter and the like that input the output signals of these sensors and switches to the computing processing unit 90. The output circuit 93 is provided with a driving circuit and the like that output control signals from the computing processing unit 90 to the switching devices in the inverter 83 and electric loads such as the electromagnetic solenoid 45 and the like. In addition, the computing processing unit 90 runs software items (programs) stored in the storage apparatuses 91 such as the ROM and the like and collaborates with other hardware devices such as the storage apparatuses 91, the input circuit 92, and the output circuit 93 in the controller 63, so that the respective functions of the inverter control unit 84, the electric actuator control unit 81, the power source switching unit 82, and the like included in the controller 63 are realized.

The operation of the range switching device 2 described above will collectively be explained. At first, there will be explained the case in which the elastic driving mode where the elastic energy of the elastic driving device 21 makes the output axle 18 rotate is implemented. When determining that due to the drop of the supply voltage to the range switching device 2, the ranges cannot be switched by the motor 14, the controller 63 switches the ranges by means of the elastic energy of the elastic driving device 21. In this case, at first, the controller 63 energizes the electromagnetic solenoid 45 so as to turn the state of the holding mechanism 39 to the releasing state, so that the elastic energy of the elastic member 20 held in the holding mechanism 39 is released. After the state of the holding mechanism 39 turns to the releasing state, the elastic energy makes the output member 40 rotate with respect to the base member 41 and hence the output axle 18 is made to rotate up to the rotation angle corresponding to the parking range, so that the ranges can be switched.

In contrast, when determining that after the supply voltage to the range switching device 2 has been restored to the normal voltage, the ranges can be switched by the motor 14, the controller 63 makes the output axle 18 rotate, as the first operation thereof, from the rotation angle corresponding to the parking range to the rotation angle corresponding to the drive range by means of the rotation driving force of the motor 14. Due to the rotation of the output axle 18, elastic energy is accumulated in the elastic member 20. Then, the controller 63 deenergizes the electromagnetic solenoid 45, so that the state of the holding mechanism 39 is turned to the holding state. Specifically, as the output axle 18 rotates, the output member 40 rotates through the intermediary of the gear mechanism 22. After the output member 40 has rotated up to a position where the output member recess 40c and the base member through-hole 41b communicate with each other, the biasing force of the plunger elastic member 51 makes the sphere-shaped locking member 53 travel from the releasing position across the base member through-hole 41b and the ring-shaped recess 52a to the holding position across the output member recess 40c and the base member through-hole 41b. As a result, the state of the holding mechanism 39 turns to the holding state where the relative pivoting between the base member 41 and the output member 40 is prevented; thus, elastic energy is held between the base member 41 and the output member 40.

As described above, in the range switching device 2 according to Embodiment 1, there is provided the elastic driving device 21 whose driving source is the elastic energy of the elastic member 20; therefore, even when the supply voltage to the range switching device 2 drops and hence it becomes difficult to switch the ranges by the motor 14, the range can be switched to the parking range by releasing the elastic energy held in the elastic driving device 21; thus, the vehicle can safely be stopped. After the supply voltage to the motor 14 is restored to its normal voltage, the range is firstly switched to the drive range by the motor 14, so that elastic energy can be accumulated and held again in the elastic driving device 21. After that, normal range switching by the motor 14 can be implemented.

The accumulated elastic energy is held through locking by the sphere-shaped locking member 53 across the two recesses, and the elastic energy is released by use of rolling of the sphere-shaped locking member 53; therefore, releasing of the locking requires no large driving power. Accordingly, releasing operation can be implemented by the low-power electromagnetic solenoid 45.

In Embodiment 1, the case where as the elastic member 20, a torsion spring is utilized has been explained; however, the present invention is not limited thereto, and as the elastic member 20, a spiral spring wound around the rotation axial center C3 may be utilized. Alternatively, it may be allowed that as the elastic member 20, a compression coil spring, an extension coil spring, or the like is utilized and as the elastic driving device 21, a rack-and-pinion mechanism that converts reciprocal motion into rotary motion is utilized.

In Embodiment 1, the case where in the electric actuator 62, the electromagnetic solenoid 45 is utilized has been explained; however, the present invention is not limited thereto, the electromagnetic solenoid 45 may be replaced by another electric actuator that can release the locking of the holding mechanism 39 with small electric power, for example, an electric motor that performs rotation drive of a rack-and-pinion mechanism and a pinion.

Moreover, it may be allowed that instead of the electric actuator 62, there are provided an elastic member that biases the lock releasing member 52 toward the axial-direction first side X1 and a manual operation mechanism in which a wire connected with the lock releasing member 52 is manually pulled so that the lock releasing member 52 is made to travel toward the axial-direction second side X2. Because releasing of the locking member 53 requires no large driving power, the operation can manually be implemented.

In Embodiment 1, there has been explained the case where the coupling mechanism that couples the elastic driving device 21 with the output axle 18 is the gear mechanism 22 configured with two gears that engage with each other; however, the present invention is not limited thereto, and the coupling mechanism may be configured, for example, with a belt and a pulley or with a chain and a sprocket.

Furthermore, the transmission ratio of the gear mechanism 22 may be any one of a reduction ratio, a constant-velocity ratio, and an increasing ratio. In the case of a reduction ratio, it is made possible to amplify the torque produced by the elastic energy of the elastic member 20 and then transmit the torque to the output axle 18; in the case of an increasing ratio, the torsional angle of the elastic member 20 can be reduced in comparison with the case of the reduction ratio, and in the operation of accumulating elastic energy again in the elastic member 20, the torque to be outputted by the motor 14 can be reduced. Still moreover, as the gear mechanism 22, a variable-velocity-ratio gear such as an elliptic gear may be utilized.

Various modifications and alterations of this invention will be apparent to those skilled in the art without departing from the scope and spirit of this invention, and it should be understood that this is not limited to the illustrative embodiments set forth herein.

What is claimed is:

1. A range switching device comprising:
    an output axle coupled with a shift shaft of an automatic transmission that switches shift ranges;
    a motor;
    an elastic driving device whose driving force source is elastic energy accumulated in an elastic member; and
    a coupling mechanism that couples the output axle, the motor, and the elastic driving device with one another in such a way that the output axle, the motor, and the elastic driving device can transmit driving force to one another,
    wherein the elastic driving device has a holding mechanism in which there can be performed switching between a holding state where the elastic energy accumulated by use of driving force of the motor, which is transmitted through the intermediary of the coupling mechanism, is held and a releasing state where the elastic member twists about a rotational axial center of the elastic driving device to release elastic energy so as to drive the output axle.

2. The range switching device according to claim 1, further comprising an electric actuator that drives the holding mechanism so that the state of the holding mechanism is turned to the holding state or the releasing state and a controller that controls the motor and the electric actuator, wherein the controller selectively implements an electric driving mode in which the controller controls the motor so that the output axle is rotated by driving force of the motor and controls the electric actuator so that the state of the holding mechanism is turned to the holding state or an elastic driving mode in which the controller stops the control of the motor and controls the electric actuator so that the state of the holding mechanism is turned to the releasing state and hence the output axle is rotated by the elastic energy.

3. A range switching device comprising:
an output axle coupled with a shift shaft of an automatic transmission that switches shift ranges;
a motor;
an elastic driving device whose driving force source is elastic energy accumulated in an elastic member; and
a coupling mechanism that couples the output axle, the motor, and the elastic driving device with one another in such a way that the output axle, the motor, and the elastic driving device can transmit driving force to one another;
a holding mechanism in which there can be performed switching between a holding state where the elastic energy accumulated by use of driving force of the motor, which is transmitted through the intermediary of the coupling mechanism, is held and a releasing state where the elastic energy is released so as to drive the output axle;
an electric actuator that drives the holding mechanism so that the state of the holding mechanism is turned to the holding state or the releasing state and a controller that controls the motor and the electric actuator, where the controller selectively implements an electric driving mode in which the controller controls the motor so that the output axle is rotated by driving force of the motor and controls the electric actuator so that the state of the holding mechanism is turned to the holding state or an elastic driving mode in which the controller stops the control of the motor and controls the electric actuator so that the state of the holding mechanism is turned to the releasing state and hence the output axle is rotated by the elastic energy;
wherein in the case where a supply voltage is the same as or higher than a preliminarily set low voltage determination value, the controller implements the electric driving mode, and in the case where the supply voltage is lower than the low voltage determination value, the controller implements the elastic driving mode.

4. The range switching device according to claim 2, wherein after implementation of the elastic driving mode is turned to implementation of the electric driving mode, the controller makes the motor generate driving force so that the elastic energy is accumulated in the elastic member, and controls the electric actuator so that the state of the holding mechanism is turned to the holding state.

5. The range switching device according to claim 1, wherein in the case where the holding mechanism is in the releasing state, the elastic driving device biases the output axle by the elastic energy toward a predetermined rotation driving direction and in the case where the holding mechanism is in the holding state, the elastic driving device does not transmit the elastic energy to the output axle.

6. A range switching device comprising:
an output axel coupled with a shift shaft of an automatic transmission that switches shift ranges;
a motor;
an elastic driving device whose driving force source is elastic energy accumulated in an elastic member; and
a coupling mechanism that couples the output axle, the motor, and the elastic driving device with one another in such a way that the output axle, the motor, and the elastic driving device can transmit driving force to one another;
a holding mechanism in which there can be performed switching between a holding state where the elastic energy accumulated by use of driving force of the motor, which is transmitted through the intermediary of the coupling mechanism, is held and a releasing state where the elastic energy is released so as to drive the output axle;
wherein the holding mechanism includes
an output member that is locked at a first end of the elastic member and is coupled with the coupling mechanism,
a base member that is locked at a second end of the elastic member, which is the opposite side of the first end, and that is supported by a device case containing the elastic driving device,
a locking member that is locked with the base member and the output member so as to prevent relative movement between the base member and the output member at a time when the elastic energy is accumulated in the elastic member by use of driving force of the motor, and
a lock releasing member that releases locking by the locking member.

7. The range switching device according to claim 6,
wherein the elastic member is a torsion spring that twists around a rotation axial center of the elastic driving device,
wherein the output member has a cylindrical tubular portion that is disposed at the inner side in the radial direction of the rotation axial center with respect to the elastic member, and can rotate in the circumferential direction of the rotation axial center,
wherein the base member has a cylindrical tubular portion having an outer circumferential surface that slides on an inner circumferential surface of the cylindrical tubular portion of the output member, and can rotate in the circumferential direction,
wherein the lock releasing member has a cylindrical tubular portion having an outer circumferential surface that slides on an inner circumferential surface of the cylindrical tubular portion of the base member, and can travel in the axial direction of the rotation axial center,
wherein the locking member is formed in the shape of a sphere,
wherein in the cylindrical tubular portion of the base member, there is formed a base member through-hole that penetrates said cylindrical tubular portion in the radial direction,
wherein an output member recess that recesses toward the radial-direction outer side is formed in the inner circumferential surface of the cylindrical tubular portion of the output member,
wherein a ring-shaped recess that recesses toward the radial-direction inner side and extends in the circumferential direction is formed in the outer circumferential surface of the cylindrical tubular portion of the lock releasing member,
wherein when the lock releasing member travels up to the end position thereof at the axial-direction second side, the locking member travels to a releasing position across the base member through-hole and the ring-shaped recess that communicate with each other so as to enable the base member and the output member to perform relative pivoting and to hold the lock releasing member at the end position thereof at the axial-direction second side, and wherein in the case where while the lock releasing member is held at the end thereof at the axial-direction second side by the locking member and is biased toward the axial-direction first side, which is the opposite side of the axial-direction second side, when the output member twists by a predetermined holding angle in the circumferential direction with respect to the base member, the locking member travels to a holding position across the output member recess and the base member through-hole that communicate with each other, so as to prevent the base member and the output member from performing relative pivoting and to enable the lock releasing member to travel toward the axial-direction first side when being energized.

8. The range switching device according to claim 7, further comprising an electric actuator that biases the lock releasing member toward the axial-direction first side or the axial-direction second side, which is the opposite side of the axial-direction first side, wherein the electric actuator has a plunger coupled with the lock releasing member, a plunger elastic member that biases the plunger toward the axial-direction first side, and an electromagnetic solenoid that attracts the plunger toward the axial-direction second side.

9. The range switching device according to claim 7, wherein the output member and the device case have respective output member stopping portions that restrict at a predetermined output member angle the rotation, with respect to the device case, of the output member in an elastic bias direction in which the elastic member biases the output member, and wherein the base member and the device case have respective base member stopping portions that restrict at a predetermined base member angle the rotation, with respect to the device case, of the base member in an elastic bias direction in which the elastic member biases the base member.

10. The range switching device according to claim 1, wherein in the releasing state, the elastic driving device rotation-drives the output axle by the elastic energy up to a rotation angle corresponding to the parking range.

11. The range switching device according to claim 4, wherein the elastic energy is accumulated in the elastic member by twisting the elastic member about the rotational axial center of the elastic driving device.

* * * * *